J. HOGAN.
Broadcast-Seeder.
No. 226,516. Patented April 13, 1880.
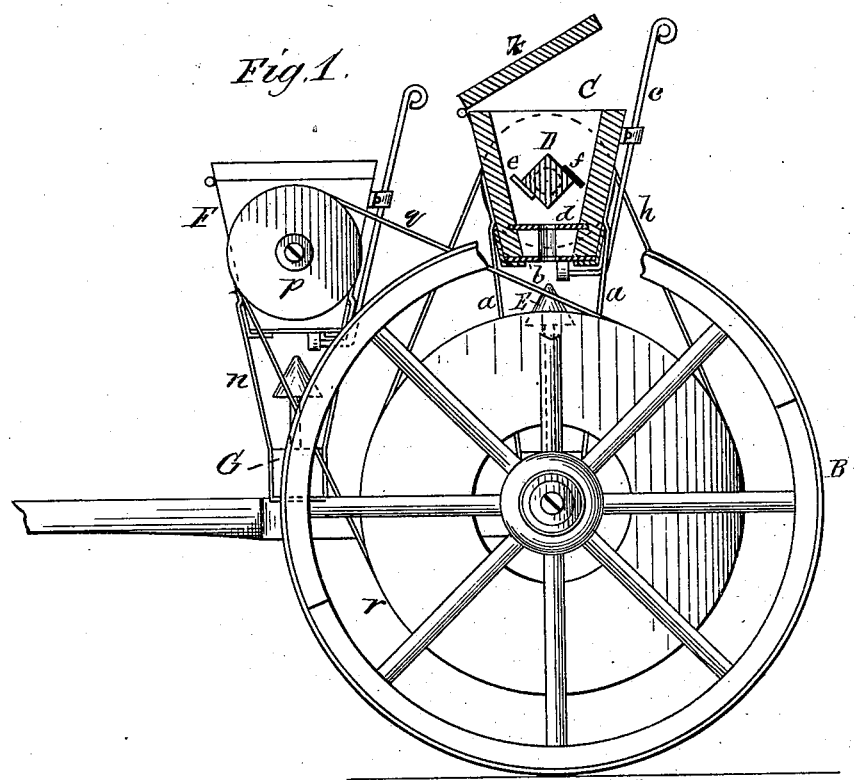
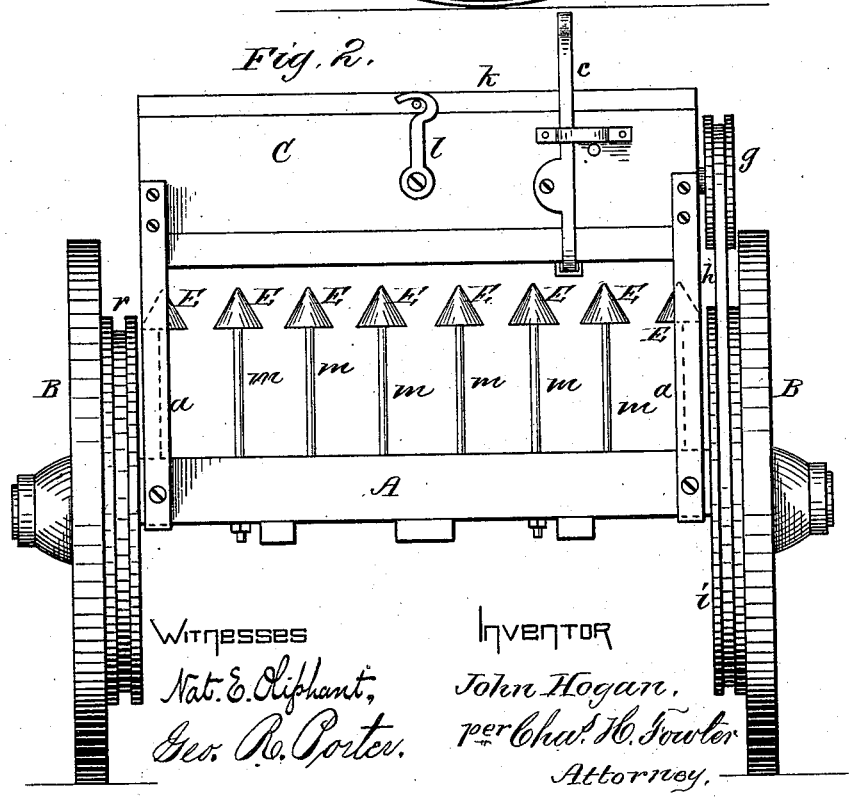

UNITED STATES PATENT OFFICE.

JOHN HOGAN, OF CULLOM, ILLINOIS.

BROADCAST SEEDER.

SPECIFICATION forming part of Letters Patent No. 226,516, dated April 13, 1880.

Application filed February 25, 1880.

*To all whom it may concern:*

Be it known that I, JOHN HOGAN, a citizen of the United States, residing at Cullom, in the county of Livingston and State of Illinois, have invented certain new and useful Improvements in Broadcast Seeders; and I do hereby declare that the following is a full, clear, and exact description of the same, reference being had to the annexed drawings, making a part of this specification, and to the letters and figures of reference marked thereon.

Figure 1 of the drawings is a side elevation of my invention, partly in section; and Fig. 2 is a rear view of the upper hopper and its scatterers connected to the carriage.

This invention has relation to new and useful improvements in broadcast seeders; and it consists in the details of construction as shown in the drawings, and which will be hereinafter described, and subsequently pointed out in the claim.

In the accompanying drawings, A represents a cross-beam serving as the axle, to which are connected suitable wheels B, for supporting the frame of the carriage. To the beam A is secured a hopper, C, by braces $a$, which support it the required distance above the beam. The bottom of the hopper is formed with suitable openings for the discharge of its contents, and the openings are closed, when desired, by a slide, $b$, operated by a lever, $c$, in reach of the driver upon the seat of the carriage. Above the slide $b$, passing through the ends of the hopper and into the same, is a second slide, $d$, which forms a supplemental bottom to the hopper, but has openings in it, similar to the slide $b$, to allow the seed or contents of the hopper to pass out of the bottom of same.

The hopper C is provided with an agitator or stirrer, D, composed of a metallic or non-elastic wing, $e$, and a rubber or other elastic wing, $f$, the wing $e$ acting more as a scraper to clear the sides of the hopper of the seed or contents of the same from caking against the sides, while the wing $f$ agitates the contents and insures an even distribution.

The axle or end of the agitator or stirrer has connected to it a grooved pulley, $g$, which, by a belt, $h$, connects with a larger pulley, $i$, rigidly secured to the inner side of one of the wheels B, so that the agitator or stirrer will be caused to rotate within the hopper by the movement of the wheel.

The hopper C is provided with a suitable hinged cover, $k$, retained closed by a hook or other fastening, $l$.

Under each opening in the bottom of the hopper C is a conical scatterer, E, upon which the seed or other contents of the hopper, as it passes from the same, strikes and is scattered over the soil. Heretofore these conical scatterers were connected under the spout or escape-opening for the seed by braces, which were secured to the outer sides of the scatterer and to the spout or escape-opening. This means of suspending the scatterer was open to many objections, among which were the impeding of the free escape of the seed over the cone by the position of the braces around the periphery of the same obstructing the course of the seed, in addition to the great liability of the scatterers becoming injured or working out of their true line with the discharge-opening; also, the expense attending their construction. I have endeavored, as far as possible, to remove these difficulties by rigidly connecting to the apex of the cone E a rod, $m$, and securing said rod, either rigidly or adjustably, to the cross-beam A, thereby forming a simple scatterer and dispensing with the several brace-pieces connected around the outer side or periphery of the cone. These means of connecting and supporting the scatterers are simple, strong, and durable, also more effective in their action.

A second hopper, F, having slides, agitator or stirrer, and other connections, similar to the hopper C, is connected by braces $n$ to a cross-beam, G, said agitator or stirrer being rotated by pulley $p$, belt $q$, and pulley $r$.

Having now fully described my invention, what I claim as new, and desire to secure by Letters Patent, is—

1. The hopper C, slides $d\ b$, in combination with the agitator or stirrer D, having elastic wing $f$, and metal or non-elastic wing $e$, substantially as and for the purpose specified.

2. The combination, with the hopper C, provided with slides $d\ b$ and agitator or stirrer D, of the conical scatterers E, supported by vertical rods $m$, connected to the cross-beam A, the upper end of said rods being secured to the apex of the cone, substantially as and for the purpose set forth.

In testimony that I claim the above I have hereunto subscribed my name in the presence of two witnesses.

JOHN HOGAN.

Witnesses:
CHARLES WEINLAND,
JAMES T. DORSEY.